B. H. Melendy,

Door Securer.

No. 103,068. Patented May 17, 1870.

Witnesses:
D. S. Mabee
Alex F. Roberts

Inventor:
B. H. Melendy
PER Munn & Co.
Attorneys.

United States Patent Office.

BRYANT H. MELENDY, OF MANCHESTER, NEW HAMPSHIRE.

Letters Patent No. 103,068, dated May 17, 1870.

IMPROVEMENT IN COMBINED DOOR-FASTENERS AND KEY-RINGS.

The Schedule referred to in these Letters Patent and making part of the same

To all whom it may concern:

Be it known that I, BRYANT H. MELENDY, of Manchester, in the county of Hillsborough and State of New Hampshire, have invented a new and useful Improvement in Combined Door-Fastener and Key-Ring; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object to furnish an improved combined door-fastener and key-ring, which shall be simple in construction and effective in operation in either capacity; and It consists in the construction and combination of the various parts of the instrument, as hereinafter more fully described.

A are the side pieces, which are connected to each other by the rivets $a^1\,a^2$.

Figure 2:
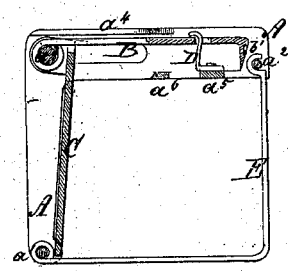
Figure 2 is a detail sectional view of the same, taken through the line $x\,x$, fig. 3.
Figure 1:
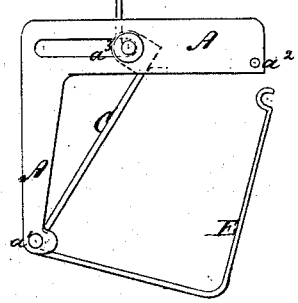
Figure 1 is a side view of my improved door-fastener and key-ring.

The pieces A are slotted, as shown in figs. 1 and 2, to receive the broad-headed rivet $a^3$, by which the claw B and compensator C are hinged to the said parts A.

Figure 3:
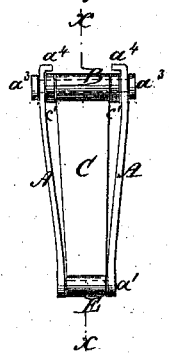
Figure 3 is a rear edge view of the same.

The outer edges of the slotted parts of the pieces A are turned in or flanged, as shown in figs. 2 and 3.

The inner part or base of the hook or claw B is made a little narrower than the space between the said parts A, for the purpose of enabling it to pass and work between the flanges $a^4$ of the parts A, and to allow space at the sides of the eye through which the rivet $a^3$ passes for the ears $c'$ of the compensator C, by which the said compensator is hinged to the said rivets $a^3$.

Upon the forward or free end of the claw or hook B is formed a claw or hook, $b'$, with a sharp edge, which, when the instrument is used as a door-fastener, is forced into the casing of the door by the operation of closing the door.

D is a small spring catch, the base of which is secured to a narrow plate, $a^5$, formed solid with, or securely attached to the inner edges of the parts A, as shown in fig. 1, and which spring catch, when the claw or hook B is closed down, passes through a hole in the said claw B, and holds it securely in place.

In the end of the claw or hook B, or, rather, in the outer side of the hook or claw $b'$ of said hook or claw, B, is formed a small groove to receive the thumb or finger-nail, for convenience in operating the said claw or hook.

Upon the side edges of the base of the compensator C are formed lugs or ears, $c'$, which embrace the eye of the claw or hook B, and through which the rivet $a^3$ passes.

The lugs or ears $c'$, by resting against the flanges $a^4$ of the parts A, serve as stops to keep the said compensator in place, and, when the hook or claw B is used for fastening the door, they serve, by resting against the flanges $a^4$ of the said parts A, to take the strain from the rivet $a^3$, should any one attempt to open the door.

$a^6$ are projections formed upon, or attached to the inner edges of the parts A, against which the compensator C strikes when the hook or claw B is pushed forward into the position shown in fig. 1, to throw the free end of the compensator C above the rivet $a^1$, to allow it to be conveniently turned up along the rear side of the hook or claw B.

The compensator C is designed to be thus used when the space between the free edge of the door and the door-casing is wide, for the purpose of filling up said space, and causing the claw $b'$ to be forced sufficiently far into the said casing to take a firm hold upon it.

E is a spring arm, upon one end of which is formed an eye, through which the rivet $a^1$ passes to hinge the said spring arm to the parts A.

Upon the other end of the spring arm E is formed a hook, which hooks upon the rivet $a^2$, and holds the said spring arm closed, as shown in fig. 2, the elasticity of the arm holding it forward upon the said rivet.

The hinged arm E thus converts the instrument into a key-ring, and the weight of the keys only holds the said arm more securely in place.

In using the instrument as a door-fastener, the hook or claw B is opened out and placed with its edge $b'$ against the door-casing, the compensator C being turned up along its rear side if the space between the door and casing be large.

The door is then closed, and, in closing, forces the hook $b'$ firmly into, and holds it in the casing. The parts A are then slipped forward upon the rivet $a^3$, as shown in fig. 1, so as to overlap the door and serve as a bolt to securely fasten the door.

Having thus described my invention,

I claim as new and desire to secure by Letters Patent—

1. The combination of the spring catch D and plate $a^5$ with the parts or pieces A and hook or claw B $b'$, substantially as herein shown and described, and for the purpose set forth.

2. The compensator C $c'$, constructed and operating in combination with the parts or pieces A, projections $a^6$, and hook or claw B $b'$, substantially as herein shown and described, and for the purpose set forth.

BRYANT H. MELENDY.

Witnesses:
JACOB I. WHITTEMORE,
WILLIAM M. SHEPERD.